US011478919B2

(12) United States Patent
Shimomura et al.

(10) Patent No.: US 11,478,919 B2
(45) Date of Patent: Oct. 25, 2022

(54) ROBOT SYSTEM AND METHOD OF CONTROLLING THE ROBOT SYSTEM

(71) Applicant: KAWASAKI JUKOGYO KABUSHIKI KAISHA, Kobe (JP)

(72) Inventors: Nobuyasu Shimomura, Kobe (JP); Masayuki Kamon, Akashi (JP); Jun Fujimori, Himeji (JP); Hiroki Kinoshita, Akashi (JP); Takuya Shitaka, Kakogawa (JP); Hiroki Takahashi, Akashi (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 73 days.

(21) Appl. No.: 16/615,030

(22) PCT Filed: May 17, 2018

(86) PCT No.: PCT/JP2018/019046
§ 371 (c)(1),
(2) Date: Nov. 19, 2019

(87) PCT Pub. No.: WO2018/212265
PCT Pub. Date: Nov. 22, 2018

(65) Prior Publication Data
US 2020/0206893 A1  Jul. 2, 2020

(30) Foreign Application Priority Data
May 19, 2017  (JP) .............................. JP2017-100384

(51) Int. Cl.
*B25J 3/04*  (2006.01)
*B25J 9/16*  (2006.01)

(52) U.S. Cl.
CPC ............... *B25J 3/04* (2013.01); *B25J 9/1633* (2013.01); *B25J 9/1664* (2013.01); *B25J 9/1687* (2013.01); *B25J 9/1694* (2013.01)

(58) Field of Classification Search
CPC . B25J 3/04; B25J 9/1633; B25J 9/1664; B25J 9/1687; B25J 9/1694; B25J 9/1689;
(Continued)

(56) References Cited

U.S. PATENT DOCUMENTS 9,849,595 B2 * 12/2017 Wang ...................... G06F 3/016
2014/0350726 A1 * 11/2014 Tsusaka ................... B25J 13/02
700/257

(Continued)

FOREIGN PATENT DOCUMENTS

JP H08-281573 A 10/1996

*Primary Examiner* — Abby Y Lin
*Assistant Examiner* — Esvinder Singh
(74) *Attorney, Agent, or Firm* — Oliff PLC

(57) ABSTRACT

A robot system includes a slave unit including a slave-side force detector configured to detect a direction and a magnitude of a reaction force acting on a workpiece held by a work end of a slave arm, a master unit including a master-side force detector configured to detect a direction and a magnitude of an operating force applied by an operator to an operation end of a master arm, and a system controller configured to generate a slave operational command and a master operational command based on the operating force and the reaction force. The system controller includes a regulator configured to correct a moving direction of the work end so that the movement of the work end in a pressing direction of an object is regulated when the reaction force exceeds an acceptable value set beforehand.

11 Claims, 8 Drawing Sheets

(58) Field of Classification Search
CPC . B25J 13/085; B25J 3/00; B25J 9/0084; B25J 9/1682; B25J 13/082; B25J 15/0004; B25J 9/1669; G05B 2219/40144; G05B 2219/40184; G05B 2219/39339; G05B 2219/40032; G05B 2219/1215; G05B 2219/39084; G05B 19/41805; G01L 5/226; G01L 5/223; G01L 5/009; A61B 34/35; A61B 34/37; A61B 34/76; A61B 34/77; A61B 2090/064; A61B 2090/065
See application file for complete search history.

(56) References Cited

U.S. PATENT DOCUMENTS

| | | | |
|---|---|---|---|
| 2015/0224639 A1* | 8/2015 | Dockter | B25J 13/025 700/264 |
| 2016/0346935 A1* | 12/2016 | Nakayama | G01L 5/1627 |
| 2017/0001301 A1* | 1/2017 | Kamiya | B25J 9/1689 |
| 2017/0312921 A1* | 11/2017 | Kobayashi | B25J 9/1687 |
| 2018/0250086 A1* | 9/2018 | Grubbs | A61B 34/77 |
| 2019/0358817 A1* | 11/2019 | Ghazaei Ardakani | B25J 13/085 |
| 2019/0388165 A1* | 12/2019 | Suzuki | A61B 34/37 |

\* cited by examiner

ROBOT SYSTEM AND METHOD OF CONTROLLING THE ROBOT SYSTEM

TECHNICAL FIELD

The present disclosure relates to a robot system and a method of controlling the robot system.

BACKGROUND ART

Conventionally, a master-slave manipulator and a control method of the same are known (for example, refer to Patent Document 1).

This master-slave manipulator is configured to switch the mode to a contact mode when a reaction force measured by a force sensor exceeds a target force value set beforehand. In this contact mode, in a force control direction set beforehand so as to be substantially in agreement with a normal direction of a work object, i.e., in a direction toward the work object and a direction away from the work object, it is configured so that, without operating a slave arm to follow operation of a master arm, the slave arm is operated by a force control in which a reaction force measured by the force sensor becomes in agreement with a target force value set beforehand. Therefore, the master-slave manipulator which performs the work while contacting the hard work object can stably be controlled.

REFERENCE DOCUMENT OF CONVENTIONAL ART

Patent Document

[Patent Document 1] JP1996-281573A

DESCRIPTION OF THE DISCLOSURE

Problem to be Solved by the Disclosure

However, in the master-slave manipulator of the Patent Document 1, in the contact mode, since input to the master arm is disabled, the slave arm cannot be operated in the direction away from the work object by operating the master arm, unless a mode switching operation is performed, and therefore, the operability is a problem.

Summary of the Disclosure

In order to solve the above problem, a robot system according to one aspect of the present disclosure includes a slave unit, a master unit, and a system controller. The slave unit includes a slave arm having a work end, a slave-side force detector configured to detect a direction and a magnitude of a reaction force acting on one of the work end and a workpiece held by the work end, when the workpiece held by the work end contacts an object to which the workpiece is assembled, a slave arm actuator configured to drive the slave arm, and a slave-side control part configured to control the slave arm actuator based on a slave operational command defining a moving direction of the work end. The master unit includes a master arm having an operation end, a master-side force detector configured to detect a direction and a magnitude of an operating force applied by an operator to the operation end, a master arm actuator configured to drive the master arm, and a master-side control part configured to control the master arm actuator based on a master operational command defining a moving direction of the operation end. The system controller generates the slave operational command, and the master operational command that causes the operation end to move in a moving direction corresponding to a moving direction of the work end of the slave operational command, based on the operating force and the reaction force. The system controller includes a converter configured to calculate the moving direction of the work end based on the operating force and the reaction force, a regulator configured to correct the moving direction of the work end so that the movement of the work end in a direction of pressing the object is regulated, when the reaction force exceeds an acceptable value set beforehand, and a command generator configured to generate the slave operational command and the master operational command based on the corrected moving direction of the work end.

According to this configuration, the pressing operation of the workpiece can be regulated, and the damage of the workpiece and the object due to the operation of the slave arm can be prevented. Further, in a state where the workpiece held by the work end presses the object, by applying the force to the operation end in a direction corresponding to the separating direction of the work end from the object, the work end of the slave arm can be moved in the separating direction from the object, thereby the operability can be improved.

In order to solve the above problem, a method of controlling a robot system according to another aspect of the present disclosure is provided. The robot system includes a slave unit, a master unit, and a system controller. The slave unit includes a slave arm having a work end, a slave-side force detector configured to detect a direction and a magnitude of a reaction force acting on one of the work end and a workpiece held by the work end, when the workpiece held by the work end contacts an object to which the workpiece is assembled, a slave arm actuator configured to drive the slave arm, and a slave-side control part configured to control the slave arm actuator based on a slave operational command defining a moving direction of the work end. The master unit includes a master arm having an operation end, a master-side force detector configured to detect a direction and a magnitude of an operating force applied by an operator to the operation end, a master arm actuator configured to drive the master arm, and a master-side control part configured to control the master arm actuator based on a master operational command defining a moving direction of the operation end. The system controller generates the slave operational command, and the master operational command that causes the operation end to move in a moving direction corresponding to the moving direction of the work end of the slave operational command, based on the operating force and the reaction force. The method includes calculating, by the system controller, the moving direction of the work end based on the operating force and the reaction force, correcting, by the system controller, the moving direction of the work end so that the movement of the work end in the pressing direction of the object is regulated, when the reaction force exceeds an acceptable value set beforehand, and generating, by the system controller, the slave operational command and the master operational command based on the corrected moving direction of the work end.

According to this configuration, the pressing operation of the workpiece can be regulated, and the damage of the workpiece and the object due to the operation of the slave arm can be prevented. Further, in a state where the workpiece held by the work end presses the object, by applying the force to the operation end in a direction corresponding to the separating direction of the work end from the object, the work end of the slave arm can be moved in the separating direction from the object, thereby the operability can be improved.

Effect of the Disclosure

The present disclosure delivers an effect of preventing the damage of the workpiece and the object due to the operation of the slave arm, and improving the operability.

MODES FOR CARRYING OUT THE DISCLOSURE

Figure 1:
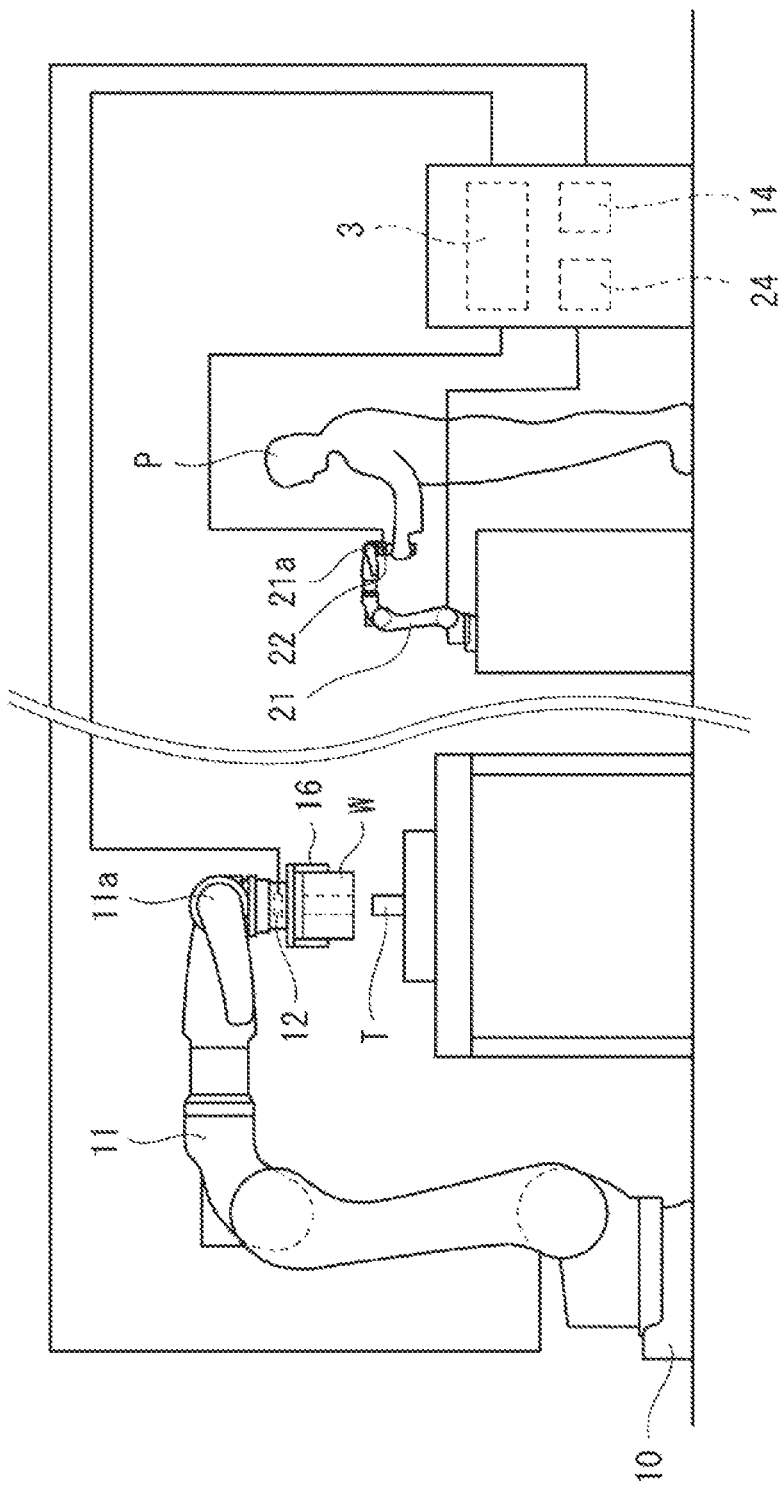
FIG. 1 is a view schematically illustrating one example of a configuration of a robot system according to Embodiment 1.

A robot system includes a slave unit, a master unit, and a system controller. The slave unit includes a slave arm having a work end, a slave-side force detector configured to detect a direction and a magnitude of a reaction force acting on one of the work end and a workpiece held by the work end, when the workpiece held by the work end contacts an object to which the workpiece is assembled, a slave arm actuator configured to drive the slave arm, and a slave-side control part configured to control the slave arm actuator based on a slave operational command defining a moving direction of the work end. The master unit includes a master arm having an operation end, a master-side force detector configured to detect a direction and a magnitude of an operating force applied by an operator to the operation end, a master arm actuator configured to drive the master arm, and a master-side control part configured to control the master arm actuator based on a master operational command defining a moving direction of the operation end. The system controller generates the slave operational command, and the master operational command that causes the operation end to move in a moving direction corresponding to a moving direction of the work end of the slave operational command, based on the operating force and the reaction force. The system controller includes a converter configured to calculate the moving direction of the work end based on the operating force and the reaction force, a regulator configured to correct the moving direction of the work end so that the movement of the work end in a pressing direction of the object is regulated, when the reaction force exceeds an acceptable value set beforehand, and a command generator configured to generate the slave operational command and the master operational command based on the corrected moving direction of the work end.

According to this configuration, the operation of pressing the workpiece can be regulated, and the damage of the workpiece and the object due to the operation of the slave arm can be prevented. Further, in a state where the workpiece held by the work end presses the object, by applying the force to the operation end in the direction corresponding to the separating direction of the work end from the object, the work end of the slave arm can be moved in the separating direction from the object, thereby the operability can be improved.

The slave operational command may be a positional instruction.

According to this configuration, in the robot system using the slave arm which operates based on the positional instruction, the damage of the workpiece or the object can effectively be prevented.

The regulator may have a force adjusting part, and the force adjusting part may correct the moving direction of the work end so that the position of the work end in the direction in which the work end presses the object is maintained temporarily, when the reaction force exceeds the acceptable value.

According to this configuration, in the robot system using the slave arm which operates based on the positional instruction, the damage of the workpiece or the object can suitably be prevented.

The converter may calculate an original velocity vector defining the moving direction and the moving speed of the work end based on a difference between the operating force and the reaction force. The regulator may have a force adjusting part, and the force adjusting part may calculate an acceleration and deceleration vector by correcting the original velocity vector so that, when a pressing direction component of the reaction force in the pressing direction of the object exceeds the acceptable value, and the original velocity vector includes a pressing direction component in the pressing direction of the object, the pressing direction component becomes 0. The command generator may generate the slave operational command and the master operational command based on the acceleration and deceleration vector.

According to this configuration, the damage of the workpiece and the object due to the operation of the slave arm can effectively be prevented.

The force adjusting part may calculate the acceleration and deceleration vector by correcting the original velocity vector so that a component of the acceleration and deceleration vector in a direction perpendicular to a pressing direction component that is a component of the acceleration and deceleration vector in the pressing direction of the object becomes the same value as a component of the original velocity vector in a direction perpendicular to the pressing direction of the object.

According to this configuration, the damage of the workpiece or the object due to the operation of the slave arm can be prevented, and the degradation of the operation feel can be prevented.

The regulator may have a force relieving part, and the force relieving part may correct the moving direction of the work end so that the work end is moved to a direction opposite from the direction in which the work end presses the object, when exceeding the acceptable value.

According to this configuration, the reaction force can be relieved when the workpiece contacts the object.

The converter may calculate an original velocity vector defining a moving direction and a moving speed of the work end based on a difference between the operating force and the reaction force. The force relieving part may calculate a relief velocity vector by correcting the original velocity vector so that, when the reaction force exceeds the acceptable value, a pressing direction component of the original velocity vector that is a component in the pressing direction of the object becomes smaller based on a deviation value from the acceptable value. The command generator may generate the slave operational command and the master operational command based on the relief velocity vector.

According to this configuration, the reaction force can suitably be relieved when the workpiece contacts the object.

The force relieving part may calculate the relief velocity vector by correcting the original velocity vector by adding an adjusted integrated value obtained by multiplying a given gain to a value obtained by integrating a value obtained by subtracting the reaction force from the acceptable value, to the pressing direction component of the original velocity vector.

According to this configuration, the reaction force can suitably be relieved when the workpiece contacts the object.

The force relieving part may set the adjusted integrated value to 0, when the reaction force falls within the acceptable value after the reaction force exceeds the acceptable value.

According to this configuration, it can be prevented that the workpiece separates from the object and thus the workability degrades.

The regulator may have a force adjusting part, and the force adjusting part may correct the moving direction of the work end so that a position of the work end in the direction in which the work end presses the object is maintained temporarily, when the reaction force exceeds the acceptable value.

According to this configuration, in the robot system using the slave arm which operates based on the positional instruction, the damage of the workpiece or the object can suitably be prevented.

The regulator may further have a force adjusting part, and the force adjusting part may calculate an acceleration and deceleration vector by correcting the relief velocity vector so that, when a pressing direction component of the reaction force in the pressing direction of the object exceeds the acceptable value and the relief velocity vector includes the pressing direction component, the pressing direction component becomes 0. The command generator may generate the slave operational command and the master operational command based on the acceleration and deceleration vector.

According to this configuration, the damage of the workpiece and the object due to the operation of the slave arm can suitably be prevented.

The force relieving part may calculate the acceleration and deceleration vector by correcting the original velocity vector so that a component of the relief velocity vector in a direction perpendicular to the pressing direction component that is the component in the pressing direction of the object becomes the same value as a component of the original velocity vector in a direction perpendicular to the pressing direction of the object. The force adjusting part may calculate the acceleration and deceleration vector by correcting the relief velocity vector so that a component of the acceleration and deceleration vector in a direction perpendicular to the pressing direction of the object becomes the same value as the component of the relief velocity vector in the direction perpendicular to the pressing direction of the object.

According to this configuration, the damage of the workpiece or the object due to the operation of the slave arm can be prevented and the degradation of the operation feel can be prevented.

A method of controlling a robot system is a method of controlling a robot system which includes a slave unit, a master unit, and a system controller. The slave unit includes a slave arm having a work end, a slave-side force detector configured to detect a direction and a magnitude of a reaction force acting on one of the work end and a workpiece held by the work end, when the workpiece held by the work end contacts an object to which the workpiece is assembled, a slave arm actuator configured to drive the slave arm, and a slave-side control part configured to control the slave arm actuator based on a slave operational command defining a moving direction of the work end. The master unit includes a master arm having an operation end, a master-side force detector configured to detect a direction and a magnitude of an operating force applied by an operator to the operation end, a master arm actuator configured to drive the master arm, and a master-side control part configured to control the master arm actuator based on a master operational command defining a moving direction of the operation end. The system controller generates the slave operational command, and the master operational command that causes the operation end to move in a moving direction corresponding to the moving direction of the work end of the slave operational command, based on the operating force and the reaction force. The method includes calculating, by the system controller, the moving direction of the work end based on the operating force and the reaction force, correcting, by the system controller, the moving direction of the work end so that the movement of the work end in the pressing direction of the object is regulated, when the reaction force exceeds an acceptable value set beforehand, and generating, by the system controller, the slave operational command and the master operational command based on the corrected moving direction of the work end.

According to this configuration, the pressing operation of the workpiece can be regulated, and the damage of the workpiece and the object due to the operation of the slave arm can be prevented. Further, in a state where the workpiece held by the work end presses the object, by applying the force to the operation end in the direction corresponding to the separating direction of the work end from the object, the work end of the slave arm can be moved in the direction separating from the object, thereby the operability can be improved.

Hereinafter, embodiments will be described with reference to the drawings. Note that the present disclosure is not limited to the embodiments. Moreover, below, throughout the figures, the same or corresponding components are denoted by the same reference characters to omit redundant description.

Embodiment 1

Figure 2:
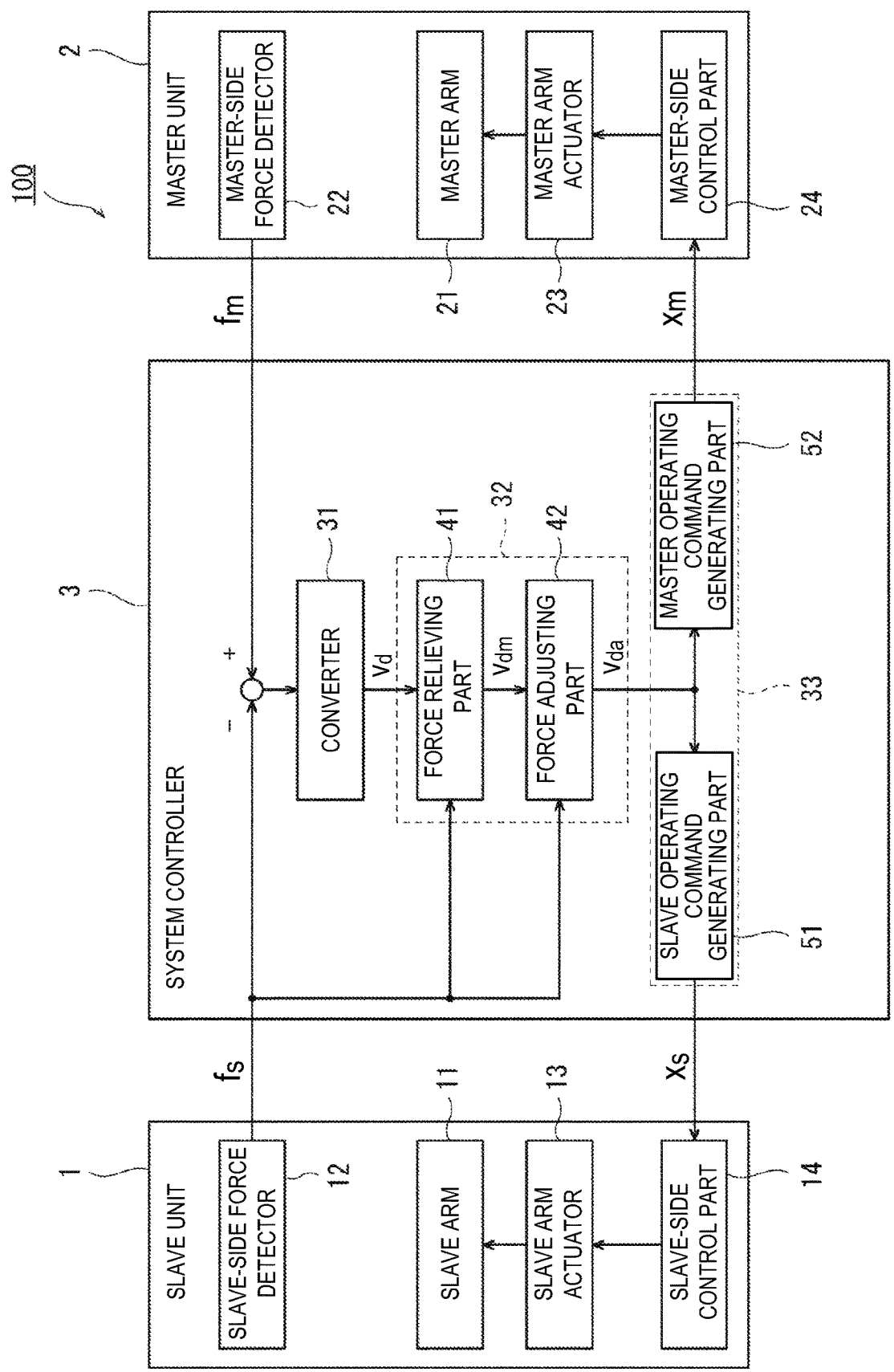
FIG. 2 is a block diagram schematically illustrating one example of a configuration of a control system of the robot system of FIG. 1.

FIG. 1 is a view schematically illustrating one example of a configuration of a robot system 100 according to Embodiment 1. FIG. 2 is a block diagram schematically illustrating one example of a configuration of a control system of the robot system 100.

As illustrated in FIGS. 1 and 2, the robot system 100 is a system including a robot of a master-slave type in which a slave arm 11 is operated to follow the motion of a master arm 21. The robot system 100 is configured so that an operator who is present at a position distant from a workspace of the slave arm 11 (outside the workspace) moves the master arm 21 to input an operational command into the robot system 100, and thereby, the slave arm 11 performs operation corresponding to the operational command to perform a particular work, such as an assembly work of a component.

Further, the robot system 100 is a robot system of a bilateral control type, and is configured so that a controller controls operation of the master arm 21 in addition to the slave arm 11 to present a force acting on the slave arm 11 to the operator through the master arm 21. The robot system 100 includes a slave unit 1 including the slave arm 11, a master unit 2 including the master arm 21, and a system controller 3.

[Example of Configuration of Slave Unit]

The slave unit 1 is an industrial robot. However, it is not limited to this configuration. The slave unit 1 includes a base 10, the slave arm 11, a slave-side force detector 12, a slave arm actuator 13 (refer to FIG. 2), and a slave-side control part 14 (refer to FIG. 2).

For example, the slave arm 11 is a vertical articulated robotic arm. That is, it includes a plurality of links serially coupled in a direction from a base-end part to a tip-end part, and one or more joints which rotatably couples one of adjacent links to the other. A tip-end part of the slave arm 11 constitutes a work end 11a, and the work end 11a is provided with a hand (end effector) 16. The base 10 is fixed to, for example, a floor, and supports the slave arm 11.

The hand 16 is configured to perform a holding operation which holds a workpiece W and a releasing operation which releases the held workpiece W. The hand 16 includes a hand actuator (not illustrated) for performing the holding operation and the releasing operation. Note that, in this embodiment, although the hand 16 is configured to perform the holding operation and the releasing operation so that, for example, the assembly work of the component can be performed, it is not limited to this configuration. Alternatively, it may be configured to perform, for example, welding and painting.

The slave-side force detector 12 is a sensor which detects a magnitude of a force acting in directions of three axes perpendicular to each other, and is disposed at the work end 11a of the slave arm 11. The slave-side force detector 12 is comprised of a 3-axes force sensor capable of detecting force components which act in the directions of three axes perpendicular to each other. Thus, when the workpiece W held by the work end 11a of the slave arm 11 contacts an object T to be assembled to the workpiece W, the slave-side force detector 12 detects a direction and a magnitude of a reaction force $f_s$ which acts on the work end 11a or the workpiece W held by the work end 11a.

The slave arm actuator 13 drives the slave arm 11. That is, the slave arm actuator 13 includes an actuator provided to each joint of the slave arm 11, and by operating each joint by the drive of the actuator, the tip-end part (work end 11a) and the hand 16 are moved within a given operating range with respect to the base-end part of the slave arm 11. For example, in this embodiment, each joint of the slave arm 11 is a rotary joint, and the actuator is a servomotor provided with a reduction gear.

The slave-side control part 14 controls the slave arm actuator 13 based on a slave operational command $x_s$ which defines a moving direction of the work end 11a to operate the slave arm 11. The slave operational command $x_s$ is a positional instruction in a slave coordinate system. The slave-side control part 14 calculates a rotational angle of an output shaft of the servomotor of each joint based on the slave operational command $x_s$, and controls current supplied to the servomotor of each joint of the slave arm 11 to control operation of the servomotor, thereby changing the posture of the slave arm 11.

[Example of Configuration of Master Unit]

The master unit 2 is installed outside the workspace and controls the operation of the slave arm 11.

The master unit 2 includes the master arm 21, a master-side force detector 22, a master arm actuator 23, and a master-side control part 24.

The master arm 21 is a device to input the operational command to the slave arm 11 from the operator P by the operator P contacting and operating the master arm 21. A part where the operator P contacts and operates constitutes an operation end 21a, and the operator P applies a force to the operation end 21a to input the operational command to the slave arm 11.

The master-side force detector 22 is a sensor which detects the magnitude of the force acting in the directions of three axes perpendicular to each other, and is disposed at the operation end 21a of the master arm 21. The master-side force detector 22 is comprised of a 3-axes force sensor capable of detecting force components which act in the directions of three axes perpendicular to each other. Thus, the master-side force detector 22 detects the operational command to the slave arm 11 from the operator P, i.e., a direction and a magnitude of an operating force $f_m$ applied by the operator P to the operation end 21a of the master arm 21.

The master arm actuator 23 drives the master arm 21. That is, the master arm actuator 23 includes an actuator provided to each joint of the master arm 21, and moves the operation end 21a of the master arm 21 by operating each joint by the drive of the actuator. In this embodiment, the actuator is, for example, a servomotor provided with a reduction gear.

The master-side control part 24 controls the master arm actuator 23 based on a master operational command $x_m$ which defines a moving direction of the operation end 21a to operate the master arm 21. The master operational command $x_m$ is a positional instruction in a master coordinate system. The master-side control part 24 calculates a rotational angle of an output shaft of the servomotor of each joint of the master arm 21 based on the master operational command $x_m$, and controls current supplied to the servomotor of each joint of the master arm 21 to control operation of the servomotor of each joint, thereby changing the posture of the master arm 21.

[Example of Configuration of System Controller]

The system controller 3 controls the slave unit 1 and the master unit 2 by a parallel type bilateral control. That is, the system controller 3 generates the slave operational command $x_s$ which is the positional instruction and the master operational command $x_m$ which is the positional instruction based on the operating force $f_m$ detected by the master-side force detector 22 and the reaction force $f_s$ detected by the slave-side force detector 12. The master operational command $x_m$ is an operational command to move the operation end 21a in a moving direction corresponding to the moving direction of the work end 11a of the slave operational command $x_s$. That is, the slave coordinate system of the slave arm 11 and the master coordinate system of the master arm 21 are associated with each other, and the moving direction of the work end 11a in the slave coordinate system of the slave operational command $x_s$ and the moving direction of the operation end 21a in the master coordinate system of the master operational command $x_m$ become the same direction (in agreement with each other).

Thus, the work end 11a of the slave arm 11 operates so as to follow the motion of the operation end 21a of the master arm 21, and a force acting on the work end 11a of the slave arm 11 is presented to the operator through the operation end 21a of the master arm 21. Therefore, the operator can perform the work while recognizing the force sense when the work end 11a contacts the environment.

The system controller 3 includes a converter 31, a regulator 32, and a command generator 33. The converter 31, the regulator 32, and the command generator 33 are functional blocks implemented by a processor (not illustrated) executing a given control program.

This processor according to the slave-side control part 14, the master-side control part 24, and the system controller 3 is comprised of an arithmetic unit, such as a micro controller, a CPU, and a programmable logic device (PLD), such as an ASIC, an FPGA. The processor may be comprised of a sole controller which carries out a centralized control, or may be comprised of a plurality of controllers which collaboratively carry out a distributed control. Moreover, the system controller 3 includes a storage device (not illustrated) which stores various programs and data. Moreover, the system controller 3 may be comprised of a sole controller including the slave-side control part 14 and the master-side control part 24, or may be comprised of a plurality of controllers which collaboratively carry out a distributed control.

The converter 31 calculates the moving direction of the work end 11a based on the operating force $f_m$ detected by the master-side force detector 22 and the reaction force $f_s$ detected by the slave-side force detector 12. That is, an original velocity vector $v_d$ which defines the moving direction and the moving speed of the work end 11a based on a difference between the operating force $f_m$ and the reaction force $f_s$ is calculated. The converter 31 calculates the original velocity vector $v_d$, for example, based on the following Formula (1).

$$m \times \dot{v}_d + c_v \times v_d = f_m - f_s \quad (1)$$

Note that, m is a given mass value, and
$c_v$ is a given viscosity coefficient.

When a pressing direction component $f_{si}$ of the reaction force $f_s$ detected by the slave-side force detector 12 exceeds an acceptable value $f_{lim}$ set beforehand, the regulator 32 corrects the moving direction of the work end 11a of the slave arm 11 so that the movement of the work end 11a in a direction in which the slave arm 11 presses the object T is regulated. In this embodiment, the regulator 32 includes a force relieving part 41 and a force adjusting part 42. When the pressing direction component $f_{si}$ of the reaction force $f_s$ detected by the slave-side force detector 12 exceeds the acceptable value $f_{lim}$, the force relieving part 41 corrects the moving direction of the work end 11a of the slave arm 11 so that the work end 11a of the slave arm 11 is moved to a direction opposite from the direction in which the work end 11a of the slave arm 11 presses the object T.

In this embodiment, when the pressing direction component $f_{si}$ of the reaction force $f_s$ detected by the slave-side force detector 12 exceeds the acceptable value $f_{lim}$, a relief velocity vector $v_{dm}$ is calculated based on the original velocity vector $v_d$, for example, by using the following Formulas (2) to (5).

$$v_{dm} = v_{dmi} i + v_{dmj} j + v_{dmk} k \quad (2)$$

$$v_{dmi} = v_{di} + K_p(f_{lim} - f_{si}) + K_i \int (f_{lim} - f_{si}) d_t \quad (3)$$

$$v_{dmj} = v_{dj} \quad (4)$$

$$v_{dmk} = v_{dk} \quad (5)$$

Note that, i is a unit vector of a pressing direction (i direction) which orients to a direction of pressing the object, j is a unit vector of a j direction perpendicular to the i direction, k is a unit vector of a k direction perpendicular to the i and j directions, $v_{di}$ is an i direction component of $v_d$, $v_{dj}$ is a j direction component of $v_d$, $v_{dk}$ is a k direction component of $v_d$, $v_{dmi}$ is an i direction component of $v_{dm}$, $v_{dmj}$ is a j direction component of $v_{dm}$, and $v_{dmk}$ is a k direction component of $v_{dm}$.

That is, when the pressing direction component $f_{si}$ of the reaction force $f_s$ exceeds the acceptable value $f_{lim}$, the force relieving part 41 calculates the relief velocity vector $v_{dm}$ by adding to the pressing direction component $v_{di}$ of the original velocity vector $v_d$ a value calculated based on a value obtained by subtracting the pressing direction component $f_{si}$ of the reaction force $f_s$ from the acceptable value $f_{lim}$ to correct the original velocity vector $v_d$. That is, the relief velocity vector $v_{dm}$ is calculated by adding to the pressing direction component $v_{di}$ of the original velocity vector $v_d$ an adjusted proportional value obtained by multiplying a proportional gain $K_p$ to a value (negative value) obtained by subtracting the pressing direction component $f_{si}$ of the reaction force $f_s$ from the acceptable value $f_{lim}$, and an adjusted integrated value obtained by multiplying an integration gain $K_i$ to a value (negative value) obtained by integrating a value obtained by subtracting the pressing direction component $f_{si}$ of the reaction force $f_s$ from the acceptable value $f_{lim}$ to correct the original velocity vector $v_d$. That is, when the reaction force $f_s$ exceeds the acceptable value $f_{lim}$, the original velocity vector $v_d$ is corrected based on a deviation value from the acceptable value $f_{lim}$ so that the pressing direction component $v_{di}$ which is a component of the original velocity vector $v_d$ in the direction of pressing the object T becomes smaller to calculate the relief velocity vector $v_{dm}$. Thus, since the adjusted integrated value is added to the pressing direction component $v_{di}$, an oscillation of the value of $v_{dmi}$ can be reduced to be converged suitably within the acceptable value $f_{lim}$.

Note that, the force relieving part 41 corrects the original velocity vector $v_d$ so that components of the relief velocity vector $v_{dm}$ (the $v_{dmj}$ component and the $v_{dmk}$ component) in the directions perpendicular to the pressing direction of the object becomes the same values as components of the original velocity vector $v_d$ (the $v_{dj}$ component and the $v_{dk}$ component) in the directions perpendicular to the pressing direction of the object to calculate the relief velocity vector $v_{dm}$.

Moreover, the force relieving part 41 sets the adjusted integrated value to 0 when the reaction force $f_s$ falls within the acceptable value $f_{lim}$ after the pressing direction component $f_{si}$ of the reaction force $f_s$ exceeds the acceptable value $f_{lim}$.

On the other hand, when the pressing direction component $f_{si}$ of the reaction force $f_s$ falls within the acceptable value $f_{lim}$, the force relieving part 41 sets the original velocity vector $v_d$ as the relief velocity vector $v_{dm}$, without correcting the original velocity vector $v_d$.

When the reaction force $f_s$ exceeds the acceptable value $f_{lim}$, the force adjusting part 42 corrects the moving direction of the work end 11a so that the position of the work end 11a in the direction in which the work end 11a of the slave arm 11 presses the object T is maintained temporarily. That is, when the pressing direction component $f_{si}$ of the reaction force $f_s$ detected by the slave-side force detector 12 exceeds the acceptable value $f_{lim}$, and the relief velocity vector $v_{dm}$ includes the pressing direction component $v_{dmi}$ in the pressing direction of the object T, the relief velocity vector $v_{dm}$ is corrected so that the pressing direction component $v_{dmi}$ becomes 0 to calculate an acceleration and deceleration vector $v_{da}$.

In this embodiment, the force adjusting part 42 calculates the acceleration and deceleration vector $v_{da}$ based on the relief velocity vector $v_{dm}$, for example, by using following Formulas (6) to (9).

$$v_{da}=v_{dai}i+v_{daj}j+v_{dak}k \qquad (6)$$

$$v_{dai}=0 \qquad (7)$$

$$v_{daj}=v_{dmj} \qquad (8)$$

$$v_{dak}=v_{dmk} \qquad (9)$$

Note that, $v_{daj}$ is an i direction component of $v_{da}$, $v_{daj}$ is a j direction component of $v_{da}$, and $v_{dak}$ is a k direction component of $v_{da}$.

Note that, the force adjusting part 42 calculates the acceleration and deceleration vector $v_{da}$ by correcting the relief velocity vector $v_{dm}$ so that components of the acceleration and deceleration vector $v_{da}$ (a $v_{daj}$ component and a $v_{dak}$ component) in the directions perpendicular to the pressing direction of the object T becomes the same value as components of the relief velocity vector $v_{dm}$ (the $v_{dmj}$ component and the $v_{dmk}$ component) in the directions perpendicular to the pressing direction of the object T.

On the other hand, when the pressing direction component $f_{si}$ of the reaction force $f_s$ detected by the slave-side force detector 12 falls within the acceptable value $f_{lim}$, or when the relief velocity vector $v_{dm}$ does not include the pressing direction component $v_{dmi}$ in the pressing direction of the object (when the pressing direction component $v_{dmi}$ is 0 or a negative value), the force adjusting part 42 sets the relief velocity vector $v_{dm}$ as the acceleration and deceleration vector $v_{da}$, without correcting the relief velocity vector $v_{dm}$.

The command generator 33 generates the slave operational command $x_s$ and the master operational command $x_m$ based on the corrected moving direction of the work end 11a. That is, the command generator 33 generates the slave operational command $x_s$ and the master operational command $x_m$ based on the acceleration and deceleration vector $v_{da}$ calculated based on the relief velocity vector $v_{dm}$. The command generator 33 includes a slave operating command generating part 51 which generates the slave operational command $x_s$ defining a target position of the work end 11a based on the acceleration and deceleration vector $v_{da}$, and a master operating command generating part 52 which generates the master operational command $x_m$ defining a target position of the master arm 21 based on the acceleration and deceleration vector $v_{da}$. As described above, the master operational command $x_m$ is an operational command for moving the operation end 21a in the moving direction corresponding to the moving direction of the work end 11a of the slave operational command $x_s$.

[Example of Operation]

Next, one example of operation of the robot system 100 is described.

Figure 3A:
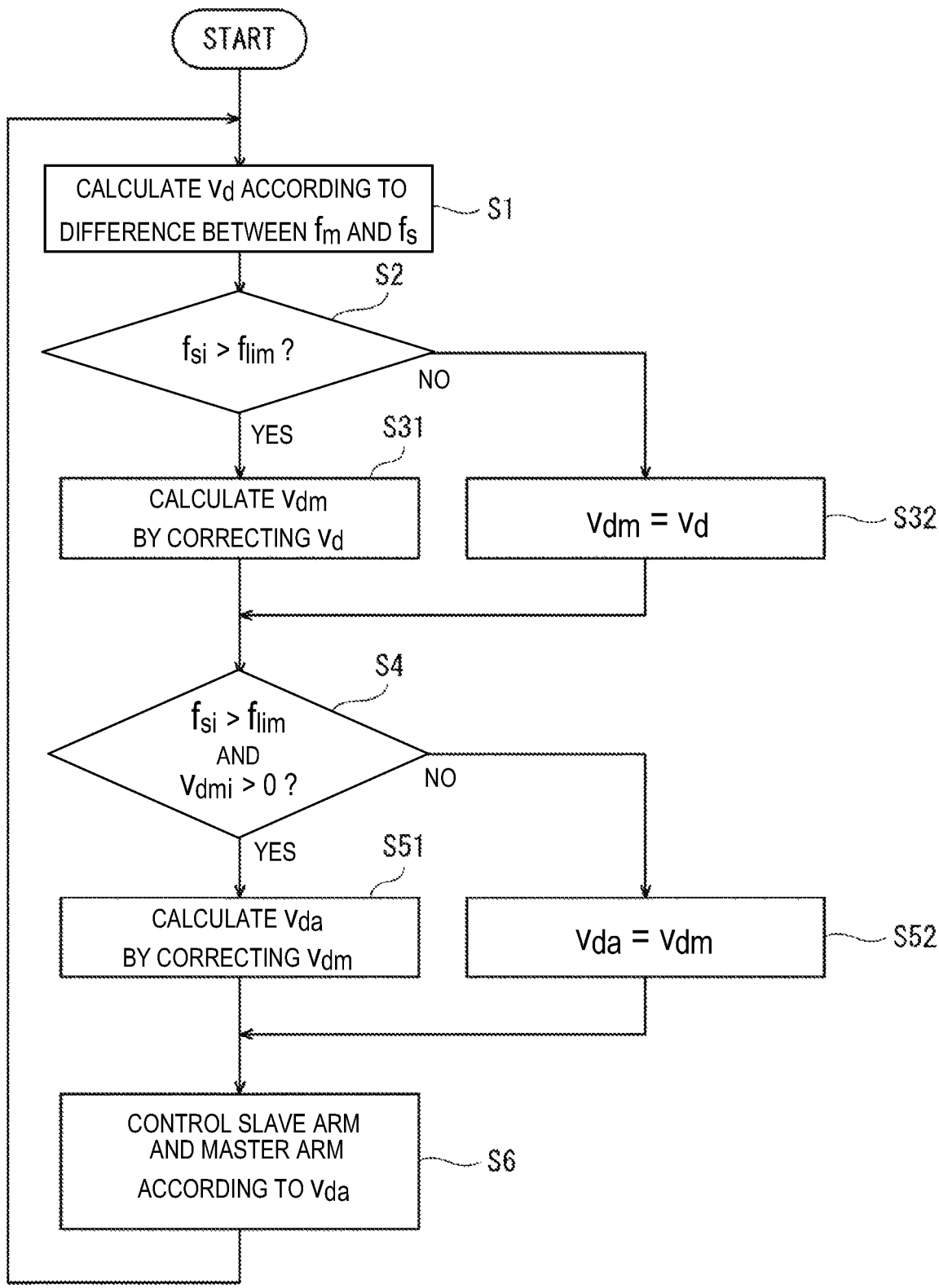
FIG. 3A is a flowchart illustrating one example of operation of the robot system of FIG. 1.
Figure 3B:
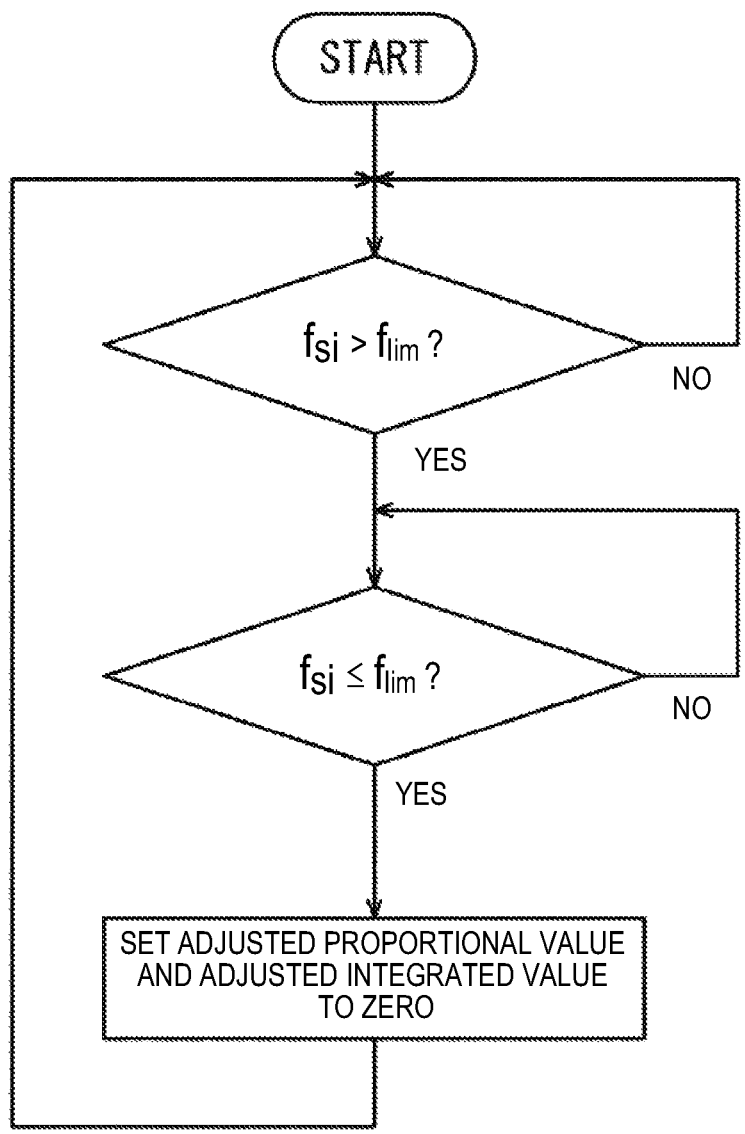
FIG. 3B is a flowchart illustrating one example of operation of the robot system of FIG. 1.
Figure 4A:
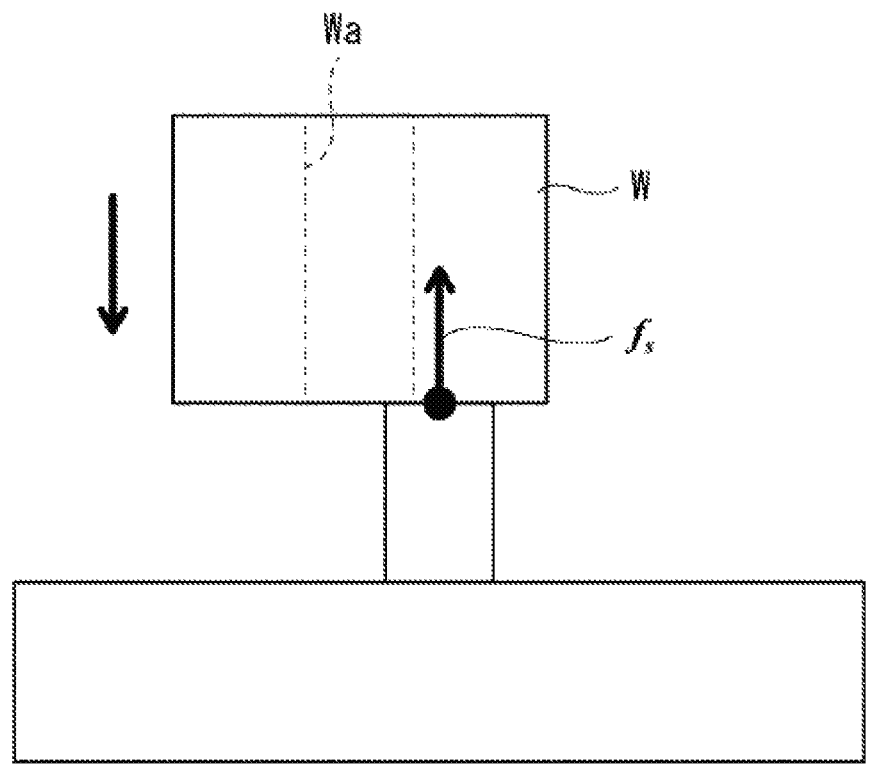
FIG. 4A is a view illustrating one example of operation of the robot system of FIG. 1.
Figure 4B:
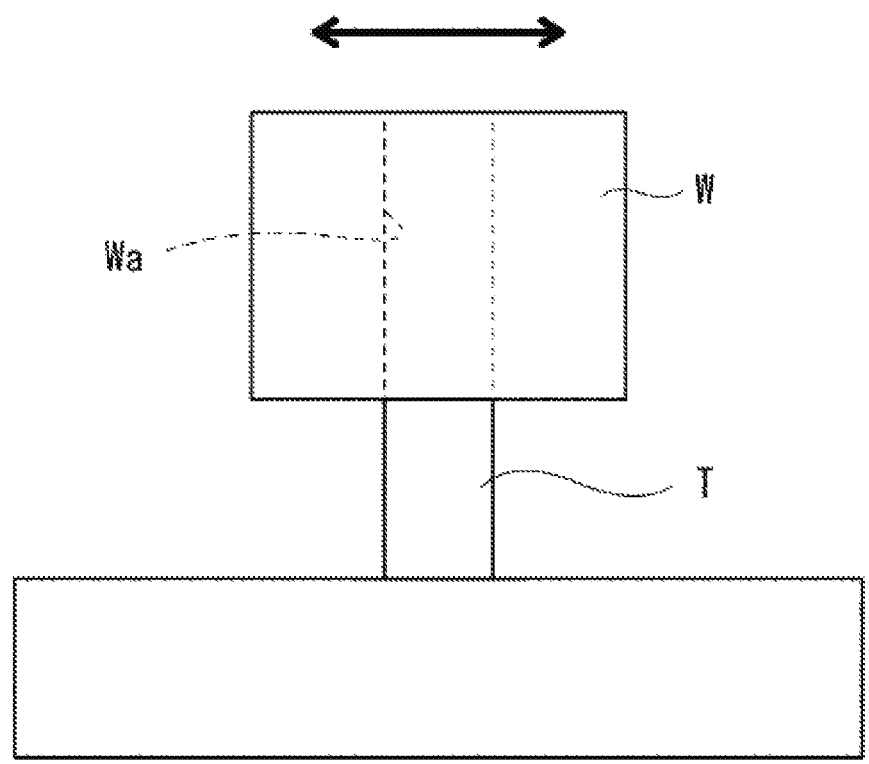
FIG. 4B is a view illustrating one example of operation of the robot system of FIG. 1.

FIGS. 3A and 3B are flowcharts illustrating one example of operation of the robot system 100. FIGS. 4A and 4B are views illustrating one example of operation of the robot system 100. In this example of operation, a work in which the workpiece W which is formed in a cylindrical shape and has a through-hole Wa is fitted onto an object T which is a cylindrical pin extending in the up-and-down direction and is formed so as to fit into the through-hole Wa to assemble the workpiece W to the object T is performed using the robot system 100. The workpiece W is gripped by the hand 16 of the slave arm 11, and the object T is located, for example, on a product line.

First, in a state where the master arm 21 is not operated and the slave arm 11 does not contact the environment of the object T etc., the operating force $f_m$ is 0, the reaction force $f_s$ is also 0, and the difference between the operating force $f_m$ and the reaction force $f_s$ is also 0. Therefore, the original velocity vector $v_d$ calculated by the converter 31, the relief velocity vector $v_{dm}$ calculated by the force relieving part 41, and the acceleration and deceleration vector $v_{da}$ calculated by the force adjusting part 42 are all 0, and the slave operating command generating part 51 and the master operating command generating part 52 do not update the target positions of the slave arm 11 and the master arm 21, respectively. Therefore, the slave arm 11 and the master arm 21 maintain the current posture.

Next, when the operator P applies the operating force $f_m$ to the operation end 21a of the master arm 21 in a direction to brings the workpiece W close to the object T (i.e., downwardly), the converter 31 calculates the downward original velocity vector $v_d$ having the magnitude according to the difference between the operating force $f_m$ and the reaction force $f_s$, i.e., the downward original velocity vector $v_d$ having the magnitude according to the operating force $f_m$ (Step S1).

Next, the force relieving part 41 determines whether the pressing direction component $f_{si}$ of the reaction force $f_s$ detected by the slave-side force detector 12 exceeds the acceptable value $f_{lim}$ (Step S2). In the state where the workpiece W moves toward the object T, since the reaction force $f_s$ detected by the slave-side force detector 12 is 0 and it falls within the acceptable value $f_{lim}$ (No at Step S2), the original velocity vector $v_d$ is set as the relief velocity vector $v_{dm}$, without correcting the original velocity vector $v_d$ (Step S32).

Next, the force adjusting part 42 determines whether the pressing direction component $f_{si}$ of the reaction force $f_s$ detected by the slave-side force detector 12 exceeds the acceptable value $f_{lim}$, and the relief velocity vector $v_{dm}$ includes the pressing direction component $v_{dmi}$ in the pressing direction of the object T (Step S4). In the state where the workpiece W moves toward the object T, since the pressing direction component $f_{si}$ of the reaction force $f_s$ detected by the slave-side force detector 12 is 0 (No at Step S4), the relief velocity vector $v_{dm}$ is set as the acceleration and deceleration vector $v_{da}$, without correcting the relief velocity vector $v_{dm}$ (Step S52).

Next, the slave operating command generating part 51 generates the slave operational command $x_s$ based on the acceleration and deceleration vector $v_{da}$, and updates the target position of the work end 11a of the slave arm 11 to a position below the current position in the slave coordinate system. The slave operational command $x_s$ is inputted into the slave-side control part 14, and the slave-side control part 14 changes the posture of the slave arm 11 so that the work end 11a of the slave arm 11 moves downwardly. Moreover, the master operating command generating part 52 generates the master operational command $x_m$ based on the acceleration and deceleration vector $v_{da}$, and updates the target position of the operation end 21a of the master arm 21 to a position below the current position in the master coordinate system. The master operational command $x_m$ is inputted into the master-side control part 24, and the master-side control part 24 changes the posture of the master arm 21 so that the operation end 21a of the master arm 21 moves downwardly (Step S6). Then, Step S1 is performed again.

Thus, by repeatedly performing Steps S1-S6, the work end 11a of the slave arm 11 and the operation end 21a of the master arm 21 simultaneously move downward. Thus, the operator P can get such feeling that the work end 11a of the slave arm 11 operates as if it follows the motion of the operation end 21a of the master arm 21.

Figure 5A:
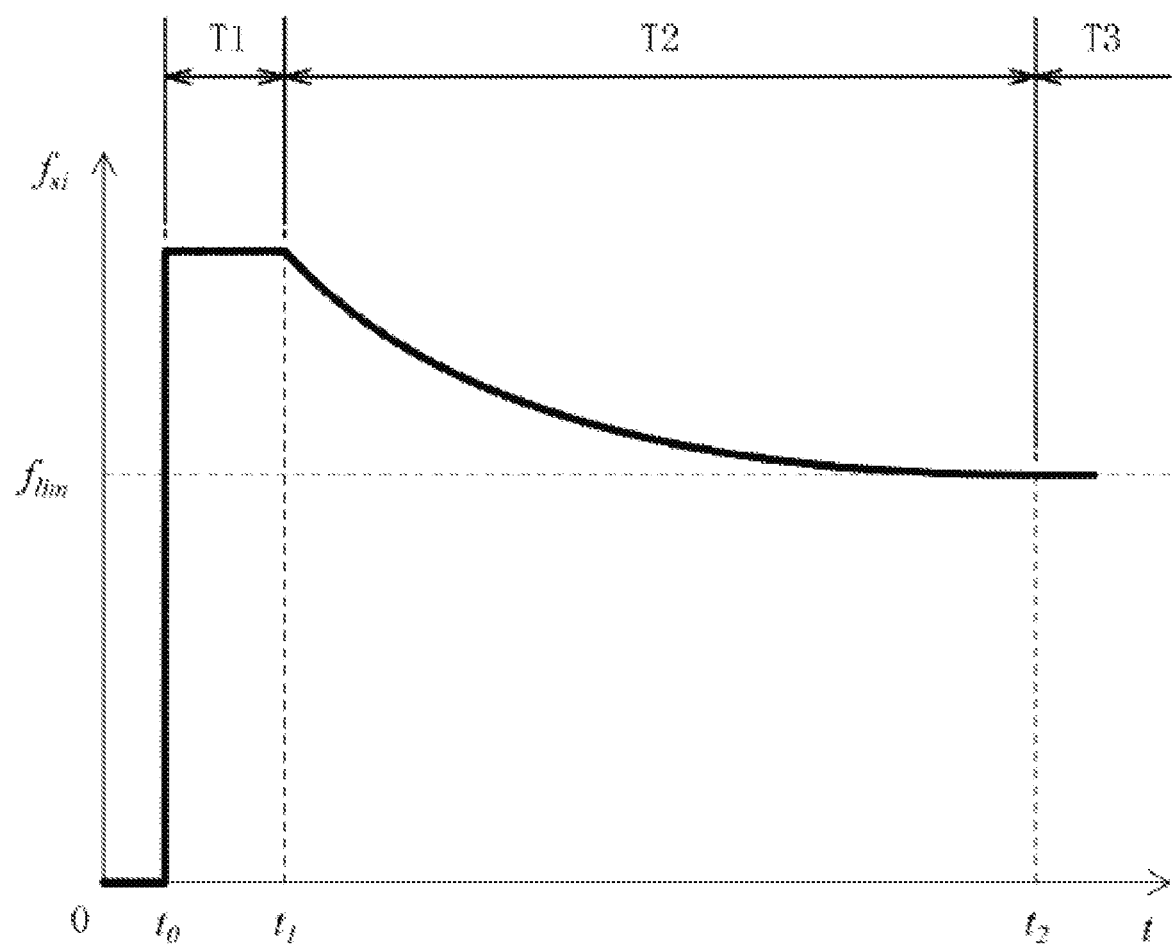
FIG. 5A is a view illustrating a change with time in a reaction force in the example of operation of the robot system of FIG. 1.

Then, since the work end 11a of the slave arm 11 moving downwardly, as illustrated in FIG. 4A, when the workpiece W contacts an upper end of the object T and the workpiece W is pressed against the object T, the reaction force acts on the workpiece W, and the reaction force $f_s$ according to the direction and the magnitude of the force is detected by the slave-side force detector 12. FIG. 5A is a graph illustrating a temporal change of the pressing direction component $f_{si}$ of the reaction force $f_s$ detected by the slave-side force detector 12 in this example of operation, where the pressing direction component $f_{si}$ of the reaction force $f_s$ exceeds the acceptable value $f_{lim}$ at a time $t_0$ when the workpiece W contacts the upper end of the object T.

Then, when the pressing direction component $f_{si}$ of the reaction force $f_s$ detected by the slave-side force detector 12 exceeds the acceptable value $f_{lim}$, the force relieving part 41 determines at Step S2 that the pressing direction component $f_{si}$ of the reaction force $f_s$ detected by the slave-side force detector 12 exceeds the acceptable value $f_{lim}$ (Yes at Step S2), and calculates the relief velocity vector $v_{dm}$ by correcting the original velocity vector $v_d$ (Step S31). As illustrated in Formula (3) the pressing direction component $v_{dmi}$ of the relief velocity vector $v_{dm}$ is calculated by adding the adjusted proportional value and the adjusted integrated value which are negative values to the pressing direction component $v_{di}$ of the original velocity vector which is a positive value, and as illustrated in FIG. 5B, the pressing direction component $v_{dmi}$ varies so that its value becomes smaller with progress of time.

Next, the force adjusting part 42 determines at Step S4 that the pressing direction component $f_{si}$ of the reaction force $f_s$ detected by the slave-side force detector 12 exceeds the acceptable value $f_{lim}$, and the relief velocity vector $v_{dm}$ includes the pressing direction component $v_{dmi}$ in the pressing direction of the object T (Yes at Step S4), and calculates the acceleration and deceleration vector $v_{da}$ by correcting the relief velocity vector $v_{dm}$ so that the pressing direction component $v_{dmi}$ becomes 0 (Step S51).

Figure 5B:
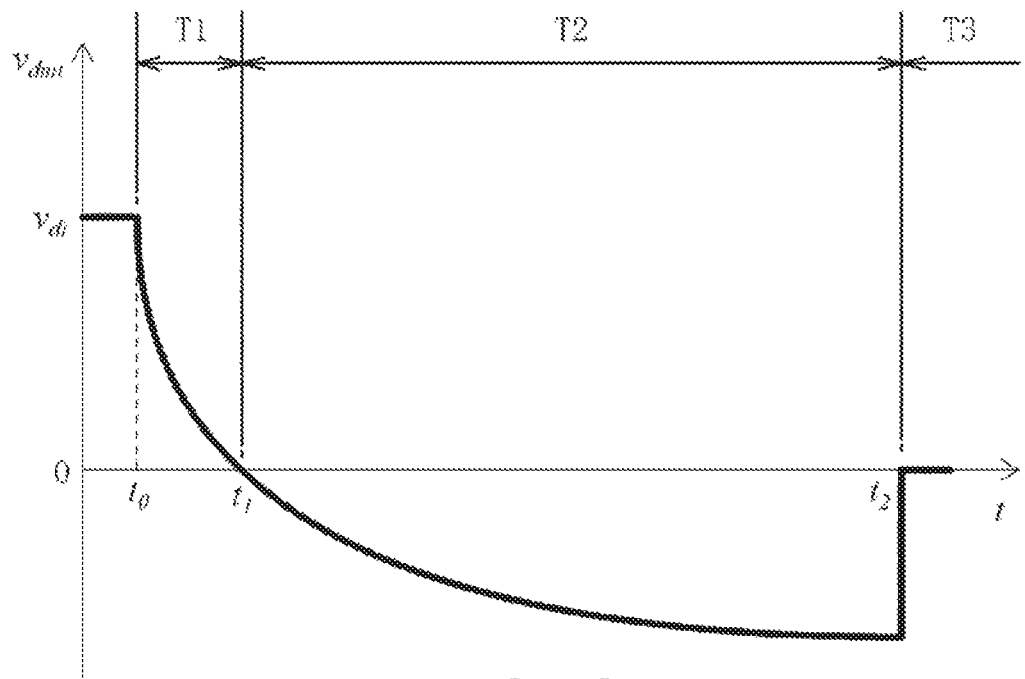
FIG. 5B is a view illustrating a change with time in a pressing direction component of a relief velocity vector in the example of operation of the robot system of FIG. 1.
Figure 5C:
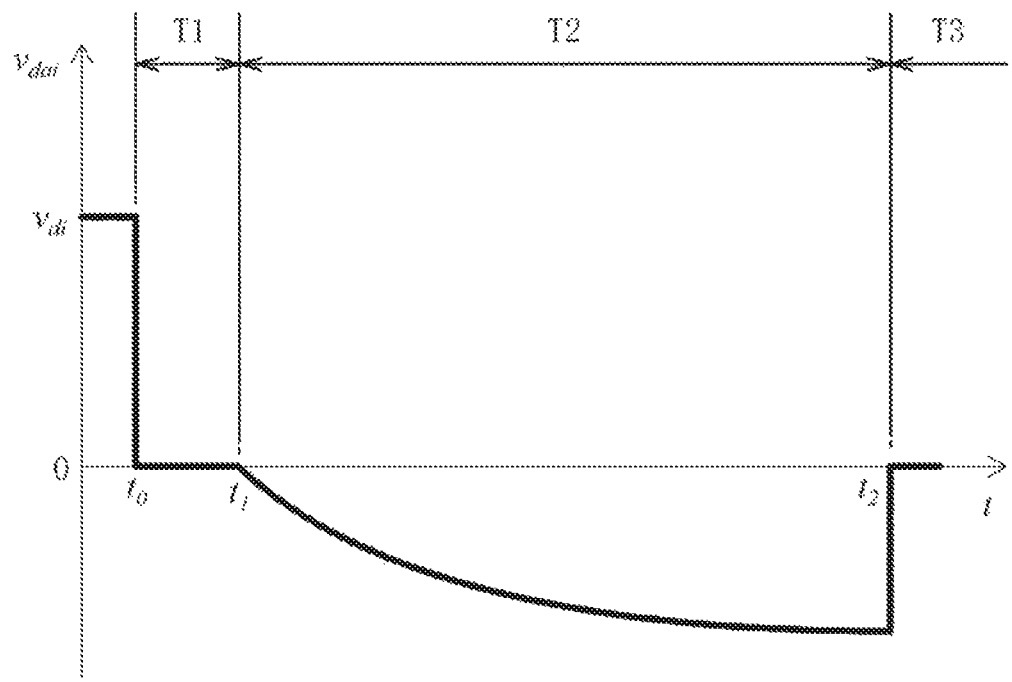
FIG. 5C is a view illustrating a change with time in a pressing direction component of an acceleration and deceleration vector in the example of operation of the robot system of FIG. 1.

That is, as illustrated in FIG. 5B, the force adjusting part 42 calculates the acceleration and deceleration vector $v_{da}$ by setting the value of the pressing direction component $v_{dmi}$ of the relief velocity vector $v_{dm}$ to 0 at a time range T1 during which the value of the pressing direction component $v_{dmi}$ is a positive value. Thus, as illustrated in FIG. 5C, during the time range T1, the pressing direction component $v_{dai}$ of the acceleration and deceleration vector $v_{da}$ is a value of 0. The target positions in the pressing direction (the direction of i) of the slave operational command $x_s$ and the master operational command $x_m$ generated based on the acceleration and deceleration vector $v_{da}$ is the same position as the current position. Therefore, during the time range T1 immediately after the workpiece W contacts the upper end of the object T, the movement of the work end 11a of the slave arm 11 is regulated so that the position of the work end 11a in the direction in which the work end 11a of the slave arm 11 presses the object T is maintained temporarily, and the work end 11a of the slave arm 11 does not move downwardly. Therefore, it can be prevented that an excessive force acts on the workpiece W and the object T, and the workpiece W and the object T are damaged. Moreover, at the time $t_0$ when the workpiece W contacts the upper end of the object T, the movement is suddenly regulated so that the operation end 21a of the master arm 21 does not move downwardly, and further, also during the time range T1 immediately after that, the movement is regulated so that the operation end 21a of the master arm 21 does not move downwardly. Therefore, the operator P can get such feeling that the work end 11a contacted the object T and received a shock. Note that, as illustrated in FIG. 5A, during the time range T1, since the work end 11a of the slave arm 11 does not move, the reaction force $f_s$ detected by the slave-side force detector 12 does not change.

Then, when an absolute value of the adjusted integrated value to be added to the original velocity vector $v_d$ increases with time, the force relieving part 41 corrects the value of the pressing direction component $v_{dmi}$ of the relief velocity vector $v_{dm}$ to be smaller, and as illustrated in FIG. 5B, when the pressing direction component $v_{dmi}$ becomes 0 or less at a time $t_1$, the force adjusting part 42 determines, as illustrated in FIGS. 5B and 5C, that the relief velocity vector $v_{dm}$ does not include, at Step S4, the pressing direction component $v_{dmi}$ in the pressing direction of the object T (No at Step S4), and sets the relief velocity vector $v_{dm}$ as the acceleration and deceleration vector $v_{da}$, without correcting the relief velocity vector $v_{dm}$. The target positions in the pressing direction (the direction of i) of the slave operational command $x_s$ and the master operational command $x_m$ generated based on the acceleration and deceleration vector $v_{da}$ is a position in the opposite direction from the direction in which the workpiece W presses the object T from the current position, i.e., on the side to which the workpiece W separates from the object T. Therefore, as illustrated in FIG. 5C, the work end 11a of the slave arm 11 moves upwardly during a time range T2 up to a time $t_2$ when the pressing direction component $f_{si}$ of the reaction force $f_s$ falls within the acceptable value $f_{lim}$. Therefore, the force of the workpiece W pressing the object T can be reduced or eliminated, and it can be effectively prevented that the workpiece W and the object T are damaged. Moreover, since the operator P gradually moves the work end 11a of the slave arm 11 upwardly during the time range T2 which follows the time range T1 during which he/she remembers the feeling according to the impact received during the time range T1, it can be prevented that vibration occurs on the slave arm 11 and the master arm 21, and it can be prevented that the operator P feels uncomfortableness to the operability of the master arm 21.

Then, during the time range T2, when the work end 11a of the slave arm 11 moves upward, as illustrated in FIG. 5A, the value of the pressing direction component $f_{si}$ of the reaction force $f_s$ decreases. Then, as illustrated in FIG. 3B, when the pressing direction component $f_{si}$ of the reaction force $f_s$ falls within the acceptable value $f_{lim}$ at the time $t_2$ after the pressing direction component $f_{si}$ of the reaction force $f_s$ exceeds the acceptable value $f_{lim}$ at a time $t_0$, the adjusted proportional value and the adjusted integrated value in Formula (3) are reset to 0. Therefore, when the pressing direction component $f_{si}$ of the reaction force $f_s$ again exceeds the acceptable value $f_{lim}$, it can be prevented that the last adjusted proportional value and the last adjusted integrated value are added to the pressing direction component $v_{di}$ of the original velocity vector $v_d$ to cause abnormalities in the operations of the slave arm 11 and the master arm 21.

Note that, in this embodiment, values of the proportional gain $K_p$ and the integration gain $K_i$ of Formula (3) are selected so that an interval from the time $t_0$ to the time $t_2$ becomes about 50 milliseconds. Therefore, the operability can be improved.

Note that, according to Formulas (2) to (5), the force relieving part 41 calculates the relief velocity vector $v_{dm}$ by correcting the original velocity vector $v_d$ so that the component of the relief velocity vector $v_{dm}$ in the direction perpendicular to the pressing direction becomes the same value as the component of the original velocity vector $v_d$ in the direction perpendicular to the pressing direction. Moreover, the force adjusting part 42 calculates the acceleration and deceleration vector $v_{da}$ by correcting the relief velocity vector $v_{dm}$ so that the component of the acceleration and deceleration vector $v_{da}$ in the direction perpendicular to the pressing direction becomes the same value as the component of the relief velocity vector $v_{dm}$ in the direction perpendicular to the pressing direction. That is, the regulator 32 calculates the acceleration and deceleration vector $v_{da}$, without correcting the component of the original velocity vector $v_d$ calculated by the converter 31 in the direction perpendicular to the pressing direction (a j-direction component and a k-direction component of the original velocity vector $v_d$). Therefore, a moving operation in the j-direction and the k-direction (moving operation in the jk plane) of the workpiece W in a state where the workpiece W is pressed against the object T does not change to a state where the workpiece W is not pressed against the object T. Therefore, the operation of fitting the workpiece W onto the object T illustrated in FIG. 4B, i.e., the operation of exploring the position at which the axis of the through-hole Wa of the workpiece W becomes in agreement with the axis of the object T can be performed smoothly.

As described above, since the robot system 100 and the regulator 32 regulate the movement of the operation end 21a in the pressing direction of the object T, it can be prevented that the workpiece W and the object T are damaged by the workpiece W being moved in the plane direction perpendicular to the pressing direction in which it is pressed against the object T to cause the excessive frictional force to act between the workpiece W and the object T.

Moreover, in the state where the workpiece W held by the work end 11a is pressed against the object T, by applying the force to the operation end 21a in the direction corresponding the separating direction of the work end 11a from the object T, without performing a special operation, such as a mode switching operation, the work end 11a of the slave arm 11 can be moved in the direction separating from the object T, thereby improving the operability. That is, also in the state where the workpiece W held by the work end 11a is pressed against the object T, the operation of moving the work end 11a in the direction in which the work end 11a separates from the object T can be performed similarly to the state where the workpiece W held by the work end 11a does not contact the object T.

Further, in this embodiment, the slave arm 11 is the industrial robot, a mechanism of a large reduction ratio, such as a wave motion gearing device, is used as the reduction gear of the slave arm actuator 13, and therefore, the position control is normally used as the control of the servomotor. However, in the position control, when the workpiece W held by the work end 11a contacts the environment, such as the object T, a large reaction force occurs, and therefore, there is a possibility of damaging the workpiece W and the object T. However, since the regulator 32 regulates the movement of the operation end 21a in the pressing direction of the object T, the damage of the workpiece W and the object T can be effectively prevented in the robot system 100 using the position control.

Modifications of Embodiment 1

Although the slave-side force detector 12 detects the direction and the magnitude of the reaction force $f_s$ which acts on the work end 11a or the workpiece W held by the work end 11a of the slave arm 11 by using the sensor which is disposed at the work end 11a of the slave arm 11, it is not limited to this configuration. Alternatively, the slave-side force detector 12 may detect the direction and the magnitude of the reaction force $f_s$ which acts on the work end 11a of the slave arm 11 or the workpiece W held by the work end 11a based on the current value supplied to the servomotor of each joint of the slave arm 11.

Moreover, although the master-side force detector 22 detects the direction and the magnitude of the operating force $f_m$ applied by the operator P to the operation end 21a of the master arm 21 by using the sensor which is disposed at the operation end 21a of the master arm 21, it is not limited to this configuration. Alternatively, the master-side force detector 22 may detect the direction and the magnitude of the operating force $f_m$ applied by the operator P to the operation end 21a of the master arm 21 based on the current value supplied to the servomotor of each joint of the master arm 21.

Embodiment 2

Below, a configuration and operation of Embodiment 2 are described focusing on a difference from Embodiment 1.

Figure 6:
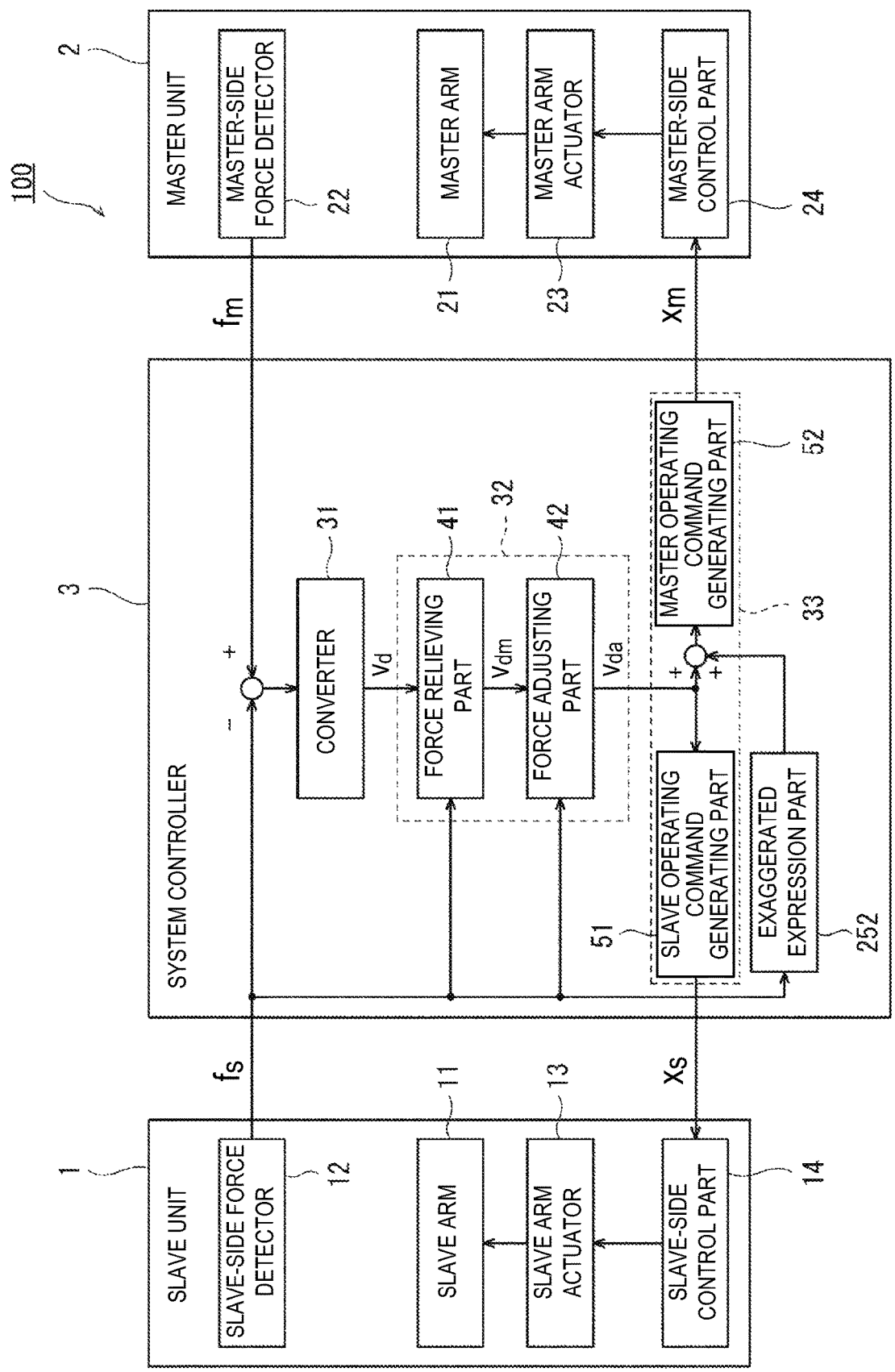
FIG. 6 is a block diagram schematically illustrating one example of a configuration of a control system of a robot system according to Embodiment 2.

FIG. 6 is a block diagram schematically illustrating one example of a configuration of a control system of a robot system according to Embodiment 2.

In Embodiment 2, the system controller 3 is further provided with an exaggerated expression part 252.

The exaggerated expression part 252 determines whether the workpiece W and the object T are in the contacting state based on the reaction force $f_s$ detected by the slave-side force detector 12, and if the exaggerated expression part 252 determines that they are in the contacting state, it presents to the operator P the sense of the contact of the workpiece W with the object T in an exaggerated fashion.

As for the presentation of the sense to the operator P, the exaggerated expression part 252 generates a velocity component based on the reaction force $f_s$ of the slave arm 11, and adds the generated velocity component to the acceleration and deceleration vector $v_{da}$ to be inputted into the master operating command generator 52. The generated velocity component is, for example, a triangular wave component for one cycle, and thereby, the sense of the slave arm 11 hitting the hard object can be expressed to the operator P who operates the operation end 21a.

Embodiment 3

In Embodiment 1, although the regulator 32 includes the force relieving part 41 and the force adjusting part 42, it is not limited to this configuration. Alternatively, the regulator 32 may include the force relieving part 41 among the force relieving part 41 and the force adjusting part 42.

In this case, the command generator 33 generates the slave operational command $x_s$ and the master operational command $x_m$, based on the relief velocity vector $v_{dm}$.

Embodiment 4

In Embodiment 1, although the regulator 32 includes the force relieving part 41 and the force adjusting part 42, it is not limited to this configuration. Alternatively, the regulator 32 may include the force adjusting part 42 among the force relieving part 41 and the force adjusting part 42.

In this case, when the pressing direction component $f_{si}$ of the reaction force $f_s$ detected by the slave-side force detector 12 exceeds the acceptable value $f_{lim}$, and the original velocity vector $v_d$ includes the pressing direction component $v_{di}$ in the pressing direction of the object T, the force adjusting part 42 calculates the acceleration and deceleration vector $v_{da}$ by correcting the original velocity vector $v_d$ so that the pressing direction component $v_{di}$ becomes 0.

It is apparent for a person skilled in the art that many improvements and other embodiments of the present disclosure are possible from the above description. Therefore, the above description is to be interpreted only as illustration, and it is provided in order to teach a person skilled in the art the best mode that implements the present disclosure. The details of the structures and/or the functions may be changed substantially, without departing from the spirit of the present disclosure.

DESCRIPTION OF REFERENCE CHARACTERS

T Object
W Workpiece
1 Slave Unit
2 Master Unit
3 System Controller
11 Slave Arm
11a Work End
12 Slave-Side Force Detector
13 Slave Arm Actuator
14 Slave-Side Control Part
21 Master Arm
21a Operation End
22 Master-Side Force Detector
23 Master Arm Actuator
24 Master-Side Control Part
31 Converter
32 Regulator
33 Command Generator
100 Robot System

What is claimed is:

1. A robot system comprising:
   a slave unit, including:
      a slave arm having a work end;
      a slave-side force detector configured to detect a direction and a magnitude of a reaction force acting on one of the work end and a workpiece held by the work end, when the workpiece held by the work end contacts an object to which the workpiece is to be assembled;
      a slave arm actuator configured to drive the slave arm; and
      a slave-side control part configured to control the slave arm actuator based on a slave operational command defining a moving direction of the work end;
   a master unit, including:
      a master arm having an operation end;
      a master-side force detector configured to detect a direction and a magnitude of an operating force applied by an operator to the operation end;
      a master arm actuator configured to drive the master arm; and
      a master-side control part configured to control the master arm actuator based on a master operational command defining a moving direction of the operation end; and
   a system controller configured to generate the slave operational command, and the master operational command that causes the operation end to move in a direction corresponding to the moving direction of the work end of the slave operational command, based on the operating force and the reaction force, the system controller including:
      a converter configured to calculate the moving direction of the work end based on the operating force and the reaction force;
      a regulator configured to correct the moving direction of the work end so that the movement of the work end in a direction of pressing the object is regulated, when the reaction force exceeds an acceptable value set beforehand; and
      a command generator configured to generate (i) the slave operational command based on the corrected moving direction of the work end and (ii) the master operational command that causes the operation end to move in a direction corresponding to the corrected moving direction of the work end, wherein
   the converter calculates an original velocity vector defining the moving direction and a moving speed of the work end based on a difference between the operating force and the reaction force,
   the regulator has a force adjusting part, the force adjusting part calculating an acceleration and deceleration vector by correcting the original velocity vector so that, when a pressing direction component of the reaction force in the direction of pressing the object exceeds the acceptable value, and the original velocity vector includes a pressing direction component in the direction of pressing the object, the pressing direction component of the original velocity vector becomes 0, and
   the command generator generates the slave operational command and the master operational command based on the acceleration and deceleration vector.

2. The robot system of claim 1, wherein the slave operational command is a positional instruction.

3. The robot system of claim 1, wherein the force adjusting part corrects the moving direction of the work end so that a position of the work end in the direction of pressing the object is maintained temporarily, when the reaction force exceeds the acceptable value.

4. The robot system of claim 1, wherein the force adjusting part calculates the acceleration and deceleration vector by correcting the original velocity vector so that a component of the acceleration and deceleration vector in a direction perpendicular to a pressing direction component that is a component of the acceleration and deceleration vector in the direction of pressing the object becomes the same value as a component of the original velocity vector in a direction perpendicular to the direction of pressing the object.

5. The robot system of claim 1, wherein the regulator has a force relieving part, the force relieving part correcting the moving direction of the work end so that the work end is moved to a direction opposite from the direction of pressing the object, when exceeding the acceptable value.

6. The robot system of claim 5, wherein
the force relieving part calculates a relief velocity vector by correcting the original velocity vector based on a deviation value from the acceptable value so that, when the reaction force exceeds the acceptable value, the pressing direction component of the original velocity vector that is a component in the direction of pressing the object becomes smaller, and
the command generator generates the slave operational command and the master operational command based on the relief velocity vector.

7. The robot system of claim 6, wherein the force relieving part calculates the relief velocity vector by correcting the original velocity vector by adding an adjusted integrated value obtained by multiplying a given gain to a value obtained by integrating a value obtained by subtracting the reaction force from the acceptable value, to the pressing direction component of the original velocity vector.

8. The robot system of claim 7, wherein the force relieving part sets the adjusted integrated value to 0, when the reaction force falls within the acceptable value after the reaction force exceeds the acceptable value.

9. The robot system of claim 6, wherein the force relieving part calculates the acceleration and deceleration vector by correcting the original velocity vector so that a component of the relief velocity vector in a direction perpendicular to the pressing direction component that is the component in the direction of pressing the object becomes the same value as a component of the original velocity vector in a direction perpendicular to the direction of pressing the object, and
wherein the force adjusting part calculates the acceleration and deceleration vector by correcting the relief velocity vector so that a component of the acceleration and deceleration vector in the direction perpendicular to the direction of pressing the object becomes the same value as the component of the relief velocity vector in the direction perpendicular to the direction of pressing the object.

10. The robot system of claim 5, wherein the force adjusting part corrects the moving direction of the work end so that a position of the work end in the direction of pressing the object is maintained temporarily, when the reaction force exceeds the acceptable value.

11. A method of controlling a robot system, the robot system including:
a slave unit, including:
a slave arm having a work end;
a slave-side force detector configured to detect a direction and a magnitude of a reaction force acting on one of the work end and a workpiece held by the work end, when the workpiece held by the work end contacts an object to which the workpiece is to be assembled;
a slave arm actuator configured to drive the slave arm; and
a slave-side control part configured to control the slave arm actuator based on a slave operational command defining a moving direction of the work end;
a master unit, including:
a master arm having an operation end;
a master-side force detector configured to detect a direction and a magnitude of an operating force applied by an operator to the operation end,
a master arm actuator configured to drive the master arm; and
a master-side control part configured to control the master arm actuator based on a master operational command defining a moving direction of the operation end; and
a system controller configured to generate the slave operational command, and the master operational command that causes the operation end to move in a direction corresponding to the moving direction of the work end of the slave operational command, based on the operating force and the reaction force,
the method comprising:
calculating, by the system controller,
the moving direction of the work end based on the operating force and the reaction force;
an original velocity vector defining the moving direction and a moving speed of the work end based on a difference between the operating force and the reaction force; and
an acceleration and deceleration vector by correcting the original velocity vector so that, when a pressing direction component of the reaction force in the direction of pressing the object exceeds the acceptable value, and the original velocity vector includes a pressing direction component in the direction of pressing the object, the pressing direction component becomes 0;
correcting, by the system controller, the moving direction of the work end so that the movement of the work end in a direction of pressing the object is regulated, when the reaction force exceeds an acceptable value set beforehand; and
generating, by the system controller, (i) the slave operational command based on the corrected moving direction of the work end and the acceleration and deceleration vector and (ii) the master operational command based on the acceleration and deceleration vector to cause the operation end to move in a direction corresponding to the corrected moving direction of the work end.

* * * * *